(12) United States Patent
Helmner et al.

(10) Patent No.: US 8,545,149 B2
(45) Date of Patent: Oct. 1, 2013

(54) NETTING ARRANGEMENT FOR A CARGO HOLD, IN PARTICULAR IN AN AIRPLANE, AND AN ADAPTER THEREFOR

(75) Inventors: Anders Helmner, Lund (SE); Orjan Christoffersson, Lund (SE); Majid Alavi, Lund (SE)

(73) Assignee: Telair International AB, Lund (SE)

( * ) Notice: Subject to any disclaimer, the term of this patent is extended or adjusted under 35 U.S.C. 154(b) by 442 days.

(21) Appl. No.: 12/531,279

(22) PCT Filed: Mar. 10, 2008

(86) PCT No.: PCT/EP2008/001897
§ 371 (c)(1),
(2), (4) Date: Jan. 26, 2010

(87) PCT Pub. No.: WO2008/110328
PCT Pub. Date: Sep. 18, 2008

(65) Prior Publication Data
US 2010/0178129 A1    Jul. 15, 2010

(30) Foreign Application Priority Data

Mar. 13, 2007  (DE) .......................... 10 2007 012 108

(51) Int. Cl.
*B61D 45/00*  (2006.01)
*B64D 47/00*  (2006.01)

(52) U.S. Cl.
USPC ........................................................ 410/118

(58) Field of Classification Search
USPC ........ 410/118, 117, 100, 97, 98; 296/100.15, 296/100.16
See application file for complete search history.

(56) References Cited

U.S. PATENT DOCUMENTS

| 2,669,402 A | * | 2/1954 | Del Mar | 410/118 |
| 3,486,723 A | * | 12/1969 | Harrison | 410/118 |
| 5,085,382 A | | 2/1992 | Finkenbeiner | |

(Continued)

FOREIGN PATENT DOCUMENTS

| DE | 3827279 | 2/1990 |
| DE | 199 53 615 A1 | 5/2001 |

(Continued)

*Primary Examiner* — Glenn Dayoan
*Assistant Examiner* — Sunsurraye Westbrook
(74) *Attorney, Agent, or Firm* — Barnes & Thornburg LLP

(57) ABSTRACT

The present invention concerns a netting arrangement for a cargo hold, in particular in an airplane, comprising: at least one netting including a plurality of fixation points preferably formed on an edge side, a plurality of fixation points formed on the cargo hold side, and at least one adapter for securing the netting in the cargo hold. The adapter is secured to at least two fixation points on the cargo hold side so as to divert a load applied to the adapter into the at least two fixation points on the cargo hold side. The adapter is arranged in the path of force between the netting fixation points preferably formed on an edge side and the fixation points on the cargo hold side. The adapter furnishes at least one adapter-side fixation point for securing the netting to the adapter. The fixation points for the netting are arranged in a plane identical with the plane of the adapter-side fixation points, independently of the load applied on the netting. In the condition where no load is applied on the netting, the netting is situated in the same plane as the adapter-side fixation points. The invention moreover relates to an adapter, preferably for use with a like netting arrangement.

15 Claims, 6 Drawing Sheets

(56) References Cited

U.S. PATENT DOCUMENTS

| | | | |
|---|---|---|---|
| 5,427,486 A * | 6/1995 | Green | 410/118 |
| 5,540,402 A * | 7/1996 | Carducci | 244/118.1 |
| 5,915,652 A | 6/1999 | Caldwell et al. | |
| 6,010,286 A | 1/2000 | Cross et al. | |
| 6,068,433 A * | 5/2000 | Baloga | 410/145 |
| 6,123,294 A * | 9/2000 | Genovese | 244/110 C |
| 6,217,268 B1 * | 4/2001 | Chou | 410/97 |
| 6,435,786 B1 | 8/2002 | Breckel et al. | |
| 7,080,967 B2 * | 7/2006 | Ackerman et al. | 410/118 |
| 7,140,823 B2 * | 11/2006 | Ackerman et al. | 410/118 |
| 7,175,378 B2 * | 2/2007 | Brown et al. | 410/118 |
| 2002/0009346 A1 | 1/2002 | Holt et al. | |

FOREIGN PATENT DOCUMENTS

| | | |
|---|---|---|
| DE | 20 2004 014965 U1 | 12/2004 |
| EP | 1539571 A1 | 6/2005 |
| WO | WO 96/23694 | 8/1996 |
| WO | 03024792 A1 | 3/2003 |
| WO | 03076267 A1 | 9/2003 |

* cited by examiner

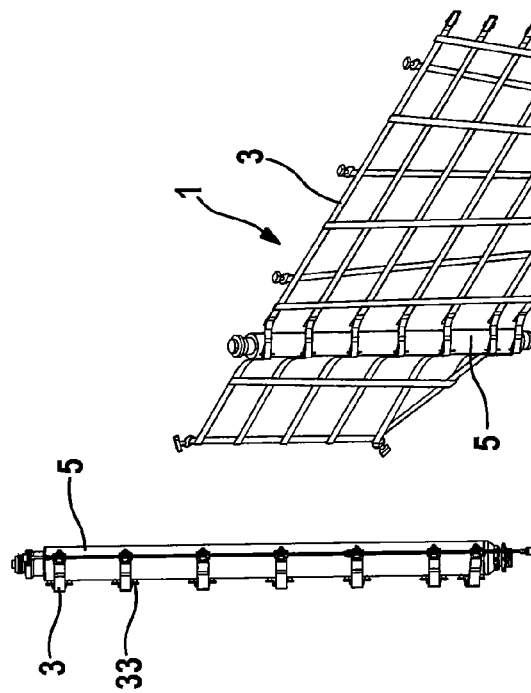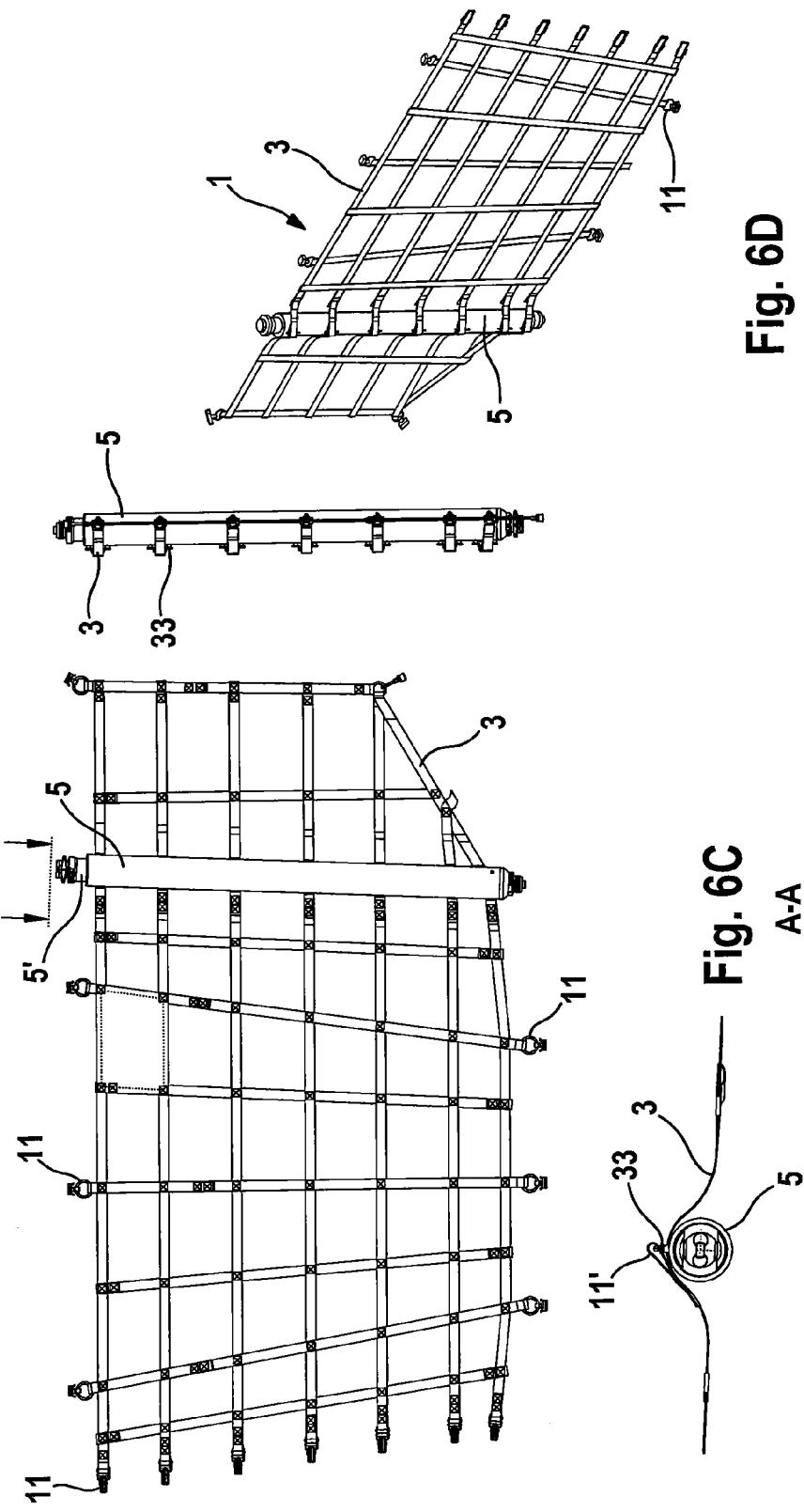

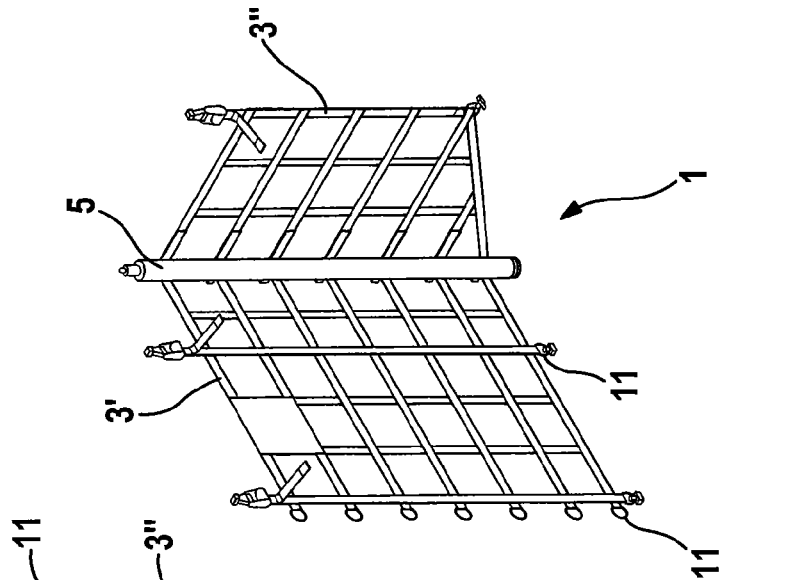

NETTING ARRANGEMENT FOR A CARGO HOLD, IN PARTICULAR IN AN AIRPLANE, AND AN ADAPTER THEREFOR

CROSS-REFERENCE TO RELATED APPLICATIONS

This application is a National Stage of International patent application PCT/EP2008/001897, filed on Mar. 10, 2008, which claims priority to foreign patent application DE 10 2007 012 108.5, filed on Mar. 13, 2007, the disclosures of which are incorporated herein by reference in their entirety.

FIELD OF THE INVENTION

The present invention relates to a netting arrangement for a cargo hold, preferably in a "narrow-body" airplane, and to an adapter therefor.

BACKGROUND OF THE INVENTION

Apart from small-sized aircraft such as, e.g., light aircraft or sporting planes, commercial airplanes are customarily classified into two main types of commercial airplanes, namely, the so-called "narrow-body" airplanes and "wide-body" or large-capacity airplanes.

Narrow-body airplanes have a fuselage diameter of up to five meters and include two rows of seats separated from each other by an aisle that extends along the longitudinal axis of the airplane.

In the case of a wide-body airplane, the fuselage diameter is in excess of 5 meters. Wide-body airplanes moreover include at least two decks each containing three rows of seats, with these rows of seats being separated from each other by two aisles that extend along the longitudinal axis of the airplane.

In wide-body or large-capacity airplanes, the baggage, freight goods, etc. are usually accommodated in correspondingly provided, large-volume freight containers which are in turn stowed away in the cargo hold of the wide-body airplanes and are secured there accordingly.

In contrast, in the case of narrow-body airplanes, the baggage and additional cargo are mostly accommodated in the cargo hold in the form of loosely stacked cargo items or in smaller-sized transport chests as described, e.g., in PCT/EP03/02494 to the same applicant and published under WO 03/076267.

In order to additionally secure such loose cargo items, nettings are usually stretched in the airplanes' cargo holds in order to retain the cargo which might otherwise uncontrollably be hurled through the cargo hold in the event, say, of an emergency landing, an unexpected sudden change of direction of the airplane, violent turbulences, etc., and might thus endanger the safety of the personnel possibly present in the cargo hold, e.g. in mail planes as used by UPS etc., as well as the safety of the airplane.

The freight or cargo nettings used for this purpose are connected to fixation points on the cargo hold side by means of corresponding fixation points formed at the netting and usually having the form of belt or strap members, lugs, shackles, rings, etc., in order to divert the forces acting on the netting into the airplane's structure as tensile forces.

These fixation points on the cargo hold side are generally distributed or arranged over the perimeter of the cargo hold at spacings predetermined by the airplane manufacturer, and are attached such that the tensile forces or loads applied to them through the netting may be diverted directly into the underlying supporting structure of the airplane.

Depending on the airplane manufacturer, the fixation points may moreover be classified into different types which are in turn adapted to receive various tensile forces or loads.

Thus in the case of Airbus, for instance, the fixation points on the cargo hold side are, subdivided into so-called "net securing points" formed on the cargo hold ceiling, and "tie-down points" formed on the floor of the cargo hold. The net securing points defined by Airbus are capable of receiving shearing loads of up to 5.9 kN and tensile loads of up to 6.8 kN, and the tie-down points are capable of receiving loads of up to 8.9 kN in any direction.

In accordance with the above explanations, fixation points formed on the netting are then secured at these fixation points to thus fasten the netting in the cargo hold and introduce the force or load acting on the netting into the airplane's structure. The fixation points formed on the netting side commonly have the form of lugs, shackles, hooks, or the like, that are disposed in the marginal area of the netting.

One example for such a netting arrangement for securing baggage on the main deck of a cargo plane is known from U.S. Pat. No. 6,435,786 D1. In the case of the arrangement disclosed in this specification, a cargo net formed with radially extending meshing is inserted loose, i.e., limp, slack, in the cargo hold of an airplane in fixation points on the cargo hold side, so as to prevent an undesirable movement of the loaded cargo pieces through the cargo hold, with the netting being devised so as to optionally allow further extension when a particular limit load is exceeded.

It is, however, problematic in this type of netting arrangement that the netting can not be fastened in areas that are not provided with fixation points on the cargo hold side.

In order to nevertheless ensure sufficient securing of the cargo, it is therefore necessary to design the netting with correspondingly long portions which are then inserted in fixation points arranged further aft of the cargo hold. There may be cases, however, where it is not possible in particular areas, particularly in recessed areas such as window areas, to connect the netting-side fixation points to the fixation points on the cargo hold side even by net portions formed with a correspondingly great length.

In order to solve this problem, U.S. Pat. No. 5,915,652 A proposes a netting arrangement for securing baggage in the cargo hold of an airplane, wherein a cargo net is secured to fixation points on the cargo hold side and to additional fixation points having the form of brackets freely swinging about an axis. These brackets are pivotally linked to fixation points on the cargo hold side, provide additional fixation points to which the netting may be connected, and are intended, e.g., to bridge a window area. Similarly to U.S. Pat. No. 6,435,786 D1, the cargo net in the case of U.S. Pat. No. 5,915,652 A is also inserted into the fixation points in a loose or limp condition, i.e., without pre-tensioning.

Another netting arrangement for the cargo hold of an airplane is disclosed in EP 1 539 571 B1. Here the cargo net is attached in fixation points on the cargo hold side and additionally taken to a predetermined tension, and thus taken into a predefined shape, by means of further biasing elements that are secured in fixation points disposed further forward in the cargo hold when viewed from the netting fixation points. At the same time this is to achieve the purpose of an end portion of the net, which reaches from a fixation point on the cargo hold side to the point of intersection with the further biasing element, to have a predefined direction oriented forward in the longitudinal direction of the airplane, so that a tensile force thus introduced into the fixation point, much in the manner of a force vector, will have a predefined direction with known longitudinal and transversal or elevational components (x-, y- and z-components).

Another type of netting arrangement is moreover disclosed in WO 03/024792 A1. In this case, in order to secure cargo in the cargo hold of an airplane, a continuous, rigid frame is arranged in the cargo hold, to which the cargo net is in turn fastened.

The netting arrangement discussed in WO 03/024792 A1 implies, however, the provision of a different specific frame construction for each type of airplane, to be mounted in the respectively different cargo holds. One drawback is the relatively high cost inevitably incurred due to the numerous required frame constructions. Furthermore the additional high complexity in terms of manufacture and assembly constitutes a drawback.

However, apart from the drawbacks already enumerated in the foregoing, the netting arrangements as known from the prior art, which are predominantly employed in the so-called narrow-body airplanes described at the outset, exhibit a number of further drawbacks.

Thus it is not possible, owing to the slack, or limp, or loose attachment of the cargo nets in the cargo, to attain a homogeneous, predefined introduction of forces into all of the fixation points on the cargo hold side when a load is suddenly applied onto the netting.

In addition there is a problem as fixation points are not formed in all the locations on the cargo hold side that are necessary or desirable for this purpose in order to receive or retain netting. As a result, continuous fastening of the net can not always be achieved, so that the load having to be received and diverted by the netting will possibly only be distributed to some few fixation points on the cargo hold side; accordingly, the overall load that can be distributed is reduced, for the maximum load that may be received by one fixation point is limited.

In order to solve this problem, as related above, U.S. Pat. No. 5,915,652 A proposes the use of an adapter or shackle freely swinging about an axis in order to correspondingly furnish sufficient fixation points.

Even if additional fixation points might thus be furnished by means of the freely swinging shackle or adapter, it is not possible, due to the furthermore loose attachment of the cargo net in the cargo hold and on the shackles or adapters, to achieve a homogeneous introduction of forces into all of the fixation points on the cargo hold side.

Furthermore the solution disclosed in U.S. Pat. No. 5,915, 652 A implies the drawback that due to the formation of a plurality of fixation points on these adapters, which surpasses the number of fixation points on the cargo hold side to which the adapters are secured, lastly an altogether increased load will be applied to the fixation points on the cargo hold side to which the adapters are secured in a freely swinging manner. Overloading of the fixation points on the cargo hold side is thus invited.

Finally, the netting arrangement discussed in EP 1 539 571 B1 in turn requires the presence of nets having a correspondingly dedicated design moreover having, in addition to the usual netting-side fixation points, further fixation members which may then be inserted in additional fixation points on the cargo hold side in order to pre-tension the netting in a sack-shaped configuration in the forward longitudinal direction of the airplane, as is represented, e.g., in FIGS. 1 and 2 of EP 1 539 571 B1. As an alternative, it is also possible to utilize conventional cargo nettings, however in this case it is necessary to attach additional retaining members to the netting when fitting the nets in the cargo hold, in order to correspondingly pre-tension the net; this does, however, have a negative effect on costs and makes manipulation cumbersome. Valuable cargo hold space is moreover lost due to the impressed convexity.

SUMMARY OF THE INVENTION

Starting out from the above discussed netting arrangements for an airplane cargo hold, it is an object of the present invention to furnish a netting arrangement for a cargo hold, in particular in an airplane, which may be manufactured at low cost and applied universally while avoiding the above discussed drawbacks of the prior art.

One aspect of the invention is to furnish a netting arrangement for a cargo hold, preferably in an airplane, whereby—independently of the number or actual availability of side fixation points formed on the cargo hold that are inherently limited through the construction—it is possible to achieve maximum homogeneity of introduction of the forces acting on the cargo netting into the actually utilized fixation points of the cargo hold, under best possible exploitation of the maximum forces that may be introduced into the respective fixation point on the cargo hold side according to the airplane manufacturer's specifications, without exceeding the admissible limit values, and without requiring a special netting for this purpose.

It is another aspect of the invention to furnish a netting arrangement for a cargo hold, in particular in an airplane, whereby it is possible to increase the overall load divertable by the netting into the airplane's structure during use in comparison with the netting arrangements already known from the prior art.

Another aspect of the present invention is to provide an adapter suitable for this purpose, preferably for use in a like netting arrangement.

The above identified object is achieved through the netting arrangement according to claim 1, and by the adapter according to claim 2.

To this end, according to a first aspect of the invention there is proposed a netting arrangement for a cargo hold, in particular in an airplane, comprising: at least one netting including a plurality of fixation points preferably formed on an edge side on the netting, a plurality of fixation points formed on the cargo hold side, and at least one adapter for securing the netting in the cargo hold. The adapter is secured to at least two fixation points on the cargo hold side so as to divert a load applied to the adapter into the at least two fixation points on the cargo hold side, wherein the adapter is arranged in the path of force between the netting fixation points preferably formed on an edge side, and the fixation points on the cargo hold side.

The adapter moreover furnishes at least one adapter-side fixation point for securing the netting to the adapter, wherein the fixation points for the netting are arranged in a plane identical with the plane of the adapter-side fixation points, independently of the load applied on the netting, and in the condition where no load is applied on the netting, the netting is situated in the same plane as the adapter-side fixation points.

By means of the above described netting arrangement it is thus for the first time advantageously possible during use to homogeneously introduce the load, which is applied on the netting by the cargo present in the form of loosely stacked cargo items, into all of the fixation points on the cargo hold side.

Thanks to the adapters it may moreover be ensured that even in locations where no fixation points, or an insufficient number of fixation points that might serve for securing the netting, are provided on the cargo hold side, it is possible to furnish fixation points formed on the adapter side for securing the netting, whereby it is advantageously possible to securely attach the netting over the entire perimeter of the cargo hold.

Furthermore with the netting arrangement of the invention it is not necessary to utilize a netting separately designed for the respective cargo hold which may then be inserted in the respective available fixation points on the cargo hold side via belt members of different lengths that are formed on the respective marginal areas of the netting, as discussed, e.g., in U.S. Pat. No. 6,435,786 D1 or in U.S. Pat. No. 5,915,652 A.

A specially configured netting having additional fixation members apart from the usual netting-side fixation points which may then be introduced into additional fixation points on the cargo hold side in accordance with the discussion in EP 1 539 571 B1 in order to pre-tension the netting, is just as unnecessary as the application of additional retaining members on the netting so as to fasten it in accordance with the arrangement discussed in EP 1 539 571 B1.

Instead, in the case of the netting arrangement of the invention, it is possible to utilize a netting that has a simple, substantially regular structure and may thus be manufactured at low cost and mounted without additional expenditure. In particular with the netting arrangement of the invention it is possible to utilize a standard cargo net in order to secure the cargo present in the form of loose cargo items.

It is a further advantage that hereby it is possible to utilize symmetrical nettings having uninterruptedly continuous net lines without offsets or steps in the force lines, to thereby enable a diversion of forces as homogeneous and easily predictable as possible.

In addition, the netting arrangement of the invention provides the advantage that thanks to the modular structure, a simple and unproblematic use in many different types of planes is possible in comparison with netting arrangements that are also partly being utilized and comprise a continuous, enclosing frame of high-strength material on which the cargo net is secured.

Accordingly, in the case of the netting arrangement of the invention there is equally no need to provide different frame constructions for the different types of airplanes in order to fasten the cargo netting in the cargo hold, as is necessary in the case of WO 03/024792 A1 discussed at the outset.

It is rather possible to achieve a sufficient securing effect for the freight or cargo present in the form of pieces of cargo, by exploiting the fixation members inherently existing inside the airplane, such as the tie-down points formed on the cargo hold side and the netting fixation points, to which the adapters are optionally secured in order to create additional fixation points.

As a result, the adapters may be kept comparatively small and need not be given the form of a continuous frame structure in order to enable continuous fastening of the netting in the cargo hold.

In addition, thanks to the fact that the load impressed onto a fixation point formed on the adapter side is split among two or more fixation points on the cargo hold side, it is possible to increase the maximum total load receivable and divertable by the netting. Due to the arrangement of the adapter in the path of force between the netting-side fixation points and the fixation points on the cargo hold side, a controlled, predictable introduction of the force applied by the netting to the adapter into the fixation points on the cargo hold side is thus ensured.

Due to the arrangement of the netting according to the invention in a plane identical with the plane of the adapter-side fixation points independently of the load applied on the netting, and owing to the fact that the netting is situated in the same plane as the adapter-side fixation points while no load is applied to the netting, it is moreover advantageously possible during the corresponding use to achieve a uniform deformation of the netting in the direction of the force vector introduced by the cargo items to the netting.

For instance in the case of a symmetrical load with a largely symmetrical displacement of the loosely stacked baggage or cargo items in a forward direction, which might occur, e.g., during violent touchdown and braking of the airplane on the runway, this has the effect that the formation of an uncontrolled "bump" of the netting by pieces of baggage in some location or other is avoided, and thus an inhomogeneous application of force on one or several fixation points on the cargo hold side is prevented. Instead, the netting is deformed largely homogeneously from its rest position in the longitudinal direction of the airplane in a forward direction, whereby the force acting on the netting is homogeneously diverted—partly via the adapters—into all of the employed fixation points on the cargo hold side. Application of an excessive load on single ones of the fixation points on the cargo hold side, or even on the underlying airplane structure, is thus reliably avoided.

According to a second aspect of the invention, an adapter usable in a netting arrangement according to the first aspect of the invention is furthermore proposed.

Here the adapter may be secured to at least two fixation points on the cargo hold side so as to distribute and/or divert a load applied to the adapter into the at least two fixation points on the cargo hold side, wherein the adapter is arranged in the path of force between the netting fixation points preferably formed on an edge side and the fixation points on the cargo hold side.

The adapter furnishes at least one adapter-side fixation point for securing the netting to the adapter, wherein the fixation points for the netting are arranged in a plane identical with the plane of the adapter-side fixation points, independently of the load applied on the netting, and in the condition where no load is applied on the netting, the netting is situated in the same plane as the adapter-side fixation points.

By means of the adapter of the invention it is thus advantageously possible to provide additional fixation points even in locations where fixation points suited to serve for securing the netting are inherently not provided on the cargo hold side or only provided in an insufficient number due to reasons of construction; such additional fixation points in combination with the fixation points on the cargo hold side allow for a continuous attachment of the netting in the cargo hold, without the need for using a specially configured netting.

Rather, thanks to the provision of the adapter-side fixation points it is possible to furnish an additional fixation point for the netting even in locations where no fixation point is normally provided in the cargo hold, so that the netting may advantageously be secured over the entire perimeter of the cargo hold.

Additionally, with the adapter of the invention it is for the first time possible to reliably divert the load generated during use in the event of an undesirable displacement of the cargo present in the form of loosely stacked cargo items while exploiting the fixation members anyway present in the airplane, e.g., the tie-down points and netting fixation points formed on the cargo hold side and to which the adapter or optionally the adapters are secured, so as to furnish additional fixation points. This lastly results in sufficient securing of the cargo.

Moreover through the intermediary of the adapter of the invention it is possible to use conventional, standardized nettings instead of costly special nettings for securing the cargo.

In particular, thanks to the adapter a modular structure may be realized in the cargo, whereby independently of the respective type of airplane a continuous fixation of the cargo netting may be ensured through low-cost means of relatively simple construction.

In addition, it is possible to increase the maximum total load receivable and divertable by the netting by splitting or distributing the load from one fixation point formed on the adapter side to two or several fixation points on the cargo hold side, wherein the arrangement of the adapter in the path of force between the netting-side fixation points and the fixation points on the cargo hold side results in a controlled introduction of the force applied to the adapter by the netting into the fixation points on the cargo hold side.

Overloading of the fixation points inherently provided in the construction of the airplane due to introduction of an excessive load into single points is hereby moreover reliably avoided.

In addition, by means of the adapter of the invention it is possible to subdivide the cargo hold, independently of existing fixation points on the cargo hold side and through the provision of fixation points formed on the adapter side, into a plurality of sections that are individually separated from each other by nets.

Thanks to this subdivision of the cargo hold into single sectors it is advantageously possible to distribute the cargo present in the form of loose cargo items to the plurality of nettings in the sectors, whereby during use a respective load applied onto a netting by the cargo may be reduced, and safety may thus be enhanced.

Through the adapter of the invention it is moreover possible to achieve the same advantages as were discussed in the foregoing in association with the netting arrangement of the invention.

Advantageous developments and further aspects of the invention moreover result from the features of the subclaims.

Thus the adapter may have the form of a bar extending transversely in the width direction of the cargo hold so as to receive a number of belt members of the netting. Here the bar may be arranged along a number of fixation points on the cargo hold side preferably formed at the ceiling of the cargo hold and secured in at least one direction in at least one fixation point on the cargo hold side, wherein the bar further comprises connecting links connecting the transversely extending bar with further fixation points on the cargo hold side. Furthermore the bar is adapted to distribute the forces applied to the bar onto fixation points disposed on the cargo hold side.

By means of the adapter it is thus advantageously possible to furnish a plurality of adapter-side fixation points that extend in a line along the width of the cargo hold.

Thanks to the realization of the adapter in accordance with the invention it is additionally possible in a controlled manner to divert the forces applied to it by the cargo net into fixation points on the cargo hold side.

Thus, in particular due to fixation and securing of the adapter in one direction in at least one fixation point, it is possible for the forces applied to the adapter to initially be diverted into this fixation point.

Concurrently with an increase of the force acting on the adapter, this force may then be diverted via the connecting links additionally formed on the adapter side into further fixation points on the cargo hold side, to thereby increase the overall force receivable and transferable by the adapter, wherein at the same time a uniform introduction of force into the support structure of the cargo hold, i.e., of the airplane, is possible.

According to another aspect of the present invention, the bar is adapted to introduce a first force applied to the bar into the at least one fixation point on the cargo hold side in which the bar is secured, and the bar is further adapted to distribute a second force applied to it into further fixation points on the cargo hold side through a controlled deformation of the bar.

As was explained in the foregoing, thanks to the adapter it is possible for a load applied by the netting to the adapter to be initially diverted into at least one fixation point on the cargo hold side to which the adapter is secured.

As a result of the controlled deformation of the adapter it may advantageously be ensured that overloading of the adapter or of the fixation point on the cargo hold side is prevented when a particular limit load, e.g., the maximum load receivable by the side fixation point on the cargo hold side in which the adapter is secured, for the load acting on the adapter is distributed to further fixation points as a result of the deformation.

According to a further aspect of the present invention, the adapter is designed such that starting from a particular degree of deformation of the bar, the connecting links of the bar enter into contact with other fixation points on the cargo hold side.

The controlled deformation of the adapter has the result that the connecting links formed on it enter into contact with other fixation points on the cargo hold side, whereby the force transferred from the netting to the adapter may be transferred to a plurality of fixation points on the cargo hold side, and whereby at the same time a homogeneous introduction of force into the support structure of the cargo hold, i.e., of the airplane, is possible.

Moreover it is advantageously possible to not only ensure a homogeneous introduction of the force applied by the netting, but at the same time to increase the maximum force divertable or transferable into the support structure.

For instance it is conceivable for the adapter of the invention to initially be attached to two fixation points on the cargo hold side, each capable of receiving a maximum load of 5 kN.

This load is diverted by each of the fixation points on the cargo hold side into the supporting structure of the cargo hold, with the introduction of force into the supporting structure of the cargo hold taking place as a function of the effective direction of the load applied by the netting to the fixation points in the x-, y- and z-directions.

When this load is exceeded, the adapter is subject to a controlled deformation, whereby the connecting links additionally formed at the adapter enter into contact with other fixation points on the cargo hold side, and the maximum load that may hereby be transferred is increased by the load receivable and transferable by the respective additional fixation points on the cargo hold side.

According to another aspect of the invention, each connecting link has a substantially tongue-type configuration and includes an opening.

Here the opening may advantageously be designed so as to substantially have the shape of a rectangle with rounded corners or an oval shape, and to leave enough play to enable a controlled deformation of the adapter.

Thanks to the respective opening formed in the connecting link it is advantageously possible to control a deformation of the adapter, for at different times the individual connecting links will enter into contact with fixation points correspondingly formed on the cargo hold side.

Alternatively, the connecting link may also have a substantially rectangular shape and include a hook etc. instead of the opening, under the proviso that upon need it is possible to achieve a fixation of the adapter in additional fixation points on the cargo hold side by means of the connecting link.

According to another aspect of the present invention, the opening extends in the longitudinal direction of the cargo hold or in the width direction of the cargo hold and enters into contact with the fixation point on the cargo hold side, depending on the degree of deformation of the bar.

Thanks to the formation of the opening of the respective connecting links it is advantageously possible to restrict a displacement in the x-, y- and z-directions caused by the load being transferred from the netting to the adapter.

Hereby it is possible to avoid forces in the x-, y- and z-directions additionally caused by such a displacement, and the force acting on the adapter may homogeneously be diverted into the supporting structure of the cargo hold.

According to another aspect of the present invention, the adapter substantially has a bridge-type configuration and interconnects at least two fixation points on the cargo hold side. Moreover the adapter furnishes at least one adapter-side fixation point between the two fixation points on the cargo hold side.

According to this embodiment of the adapter of the invention, it is possible to furnish an additional fixation point for receiving a fixation point formed on the netting side in a location of the cargo hold where a cargo hold-side fixation point is normally available.

Customarily the fixation points formed on the cargo hold side are provided in locations where the supporting structure allows for the introduction of a force. In the case of airplanes, e.g., this is usually in those locations on the fuselage where either the curved ribs or at least the longitudinally extending stringers forming the supporting structure of the airplane fuselage are located.

Thanks to the creation of an adapter-side fixation point between two fixation points on the cargo hold side, it is thus possible to increase the force that may be introduced into the support structure, for the force acting on the adapter is distributed onto at least two fixation points on the cargo hold side.

According to another aspect of the invention, the adapter extends in the width direction of the cargo hold.

Due to the bridge-type formation of the adapter extending in the width direction of the cargo hold, it is advantageously possible to furnish a fixation point for receiving fixation points formed on the netting side even in locations where it is difficult to form a fixation point on the cargo hold side. This is true, e.g., for corner areas of the cargo hold wall, or in areas having a high curvature.

According to another aspect of the invention, the adapter has the form of a longitudinal fixation member extending in the longitudinal direction of the cargo hold, wherein the fixation member is secured to at least two fixation points on the cargo hold side that extend along a longitudinal line of the cargo hold, with the fixation member furnishing at least one adapter-side fixation point. In addition, the fixation member distributes forces or loads applied to it in the longitudinal direction onto those fixation points on the cargo hold side to which the fixation member is secured.

By means of the adapter of the invention it is thus possible to furnish additional fixation points for receiving the fixation points formed on the netting side.

In addition it is advantageously possible to split the force transferred by the netting to the adapter into its x-, y-, and z-components, which may then be introduced into the fixation points on the cargo hold side. Hereby it is also possible to increase the maximum force that may be received and diverted into the fixation points on the cargo hold side.

According to another aspect of the present invention, the longitudinal fixation member may furnish at least one adapter-side fixation point between the fixation points on the cargo hold side to which the fixation member is secured, and/or furnish an adapter-side fixation point at one end of the longitudinal fixation member.

Thanks to the adapter, it is thus advantageously possible to furnish one or several additional fixation points in the cargo hold for receiving netting-side fixation points, whereby it is at the same time possible to increase the force that may be transferred or introduced into the fixation points on the cargo hold side, respectively.

In case it is necessary to secure two nettings in one location, e.g. in order to keep the door to the cargo hold free, it is in addition furthermore possible to ensure a fixation of these two nettings by the formation of corresponding adapter-side fixation points, in which case it is also possible to increase the force that may be transferred by the adapter into the fixation points on the cargo hold side.

The longitudinal fixation member moreover is preferably realized either as a pliant fixation member having tensile strength, e.g. in the form of a belt, or as a rigid fixation member having tensile strength, e.g. in the form of a bar, depending on the position of the fixation point that is formed on the adapter side.

According to another aspect of the invention, the adapter has the form of a longitudinal compression bar including at least one pre-tensioned spring element for a controlled distribution of forces, wherein the compression bar extends in the longitudinal direction of the cargo hold and is secured to at least two fixation points extending along a longitudinal line in the cargo hold.

The compression bar furthermore furnishes at least one adapter-side fixation point, wherein forces applied to the compression bar by the netting via the fixation point formed on the adapter side are distributed by the compression bar in the longitudinal direction along the adapter through the intermediary of the at least one pre-tensioned spring element.

The compression bar finally distributes the forces applied thereto into the fixation points on the cargo hold side to which the compression bar is secured, in case a force applied to the compression bar exceeds a pre-tension threshold of the spring element that is arranged in the compression bar.

Here it is advantageously possible for the compression bar to be arranged in such a manner as to extend away from the netting in a direction of the load applied by the netting to the adapter, and thus receive the load applied to the adapter through the spring element. Thus the maximum load that may be received and introduced into the supporting structure may be increased.

Alternatively, it is also conceivable for the compression bar to have the form of a tension bar extending away from the netting in the longitudinal direction of the airplane opposite to the direction of the load transferred to the netting by cargo items.

To this end, e.g., a restraining or locking member in the casing of the bar is provided which prevents further extension of the spring when the force receivable by the spring is exceeded, and instead passes the force directly on into the fixation points on the cargo hold side.

Thanks to the alternative formation as a tension bar, the load transferred to the adapter initially only acts on the one fixation point available on the cargo hold side that is positioned closest to the netting, and is diverted into further fixation points on the cargo hold side as soon as the tensile force of the spring is exceeded and the restraining member takes effect.

According to another aspect of the present invention, the compression bar furthermore furnishes at least one adapter-side fixation point between the fixation points on the cargo hold side at which the compression bar is provided, and/or furnishes an adapter-side fixation point at one end of the compression bar.

Thanks to the adapter, it is thus advantageously possible to furnish one or several additional fixation points in the cargo hold for receiving netting-side fixation points, wherein the effect of the adapter as a compression bar or tension bar allows to increase the force that may be introduced into the fixation points on the cargo hold side.

BRIEF DESCRIPTION OF THE DRAWINGS

The invention described in the foregoing shall in the following be explained in more detail by referring to an exemplary embodiment while making reference to the drawings, wherein:

FIGS. 6A through 6D are detail views of another exemplary embodiment of an inventive netting arrangement;

FIGS. 7A through 7C are detail views of another exemplary embodiment of an inventive netting arrangement.

DETAILED DESCRIPTION

Figure 1:
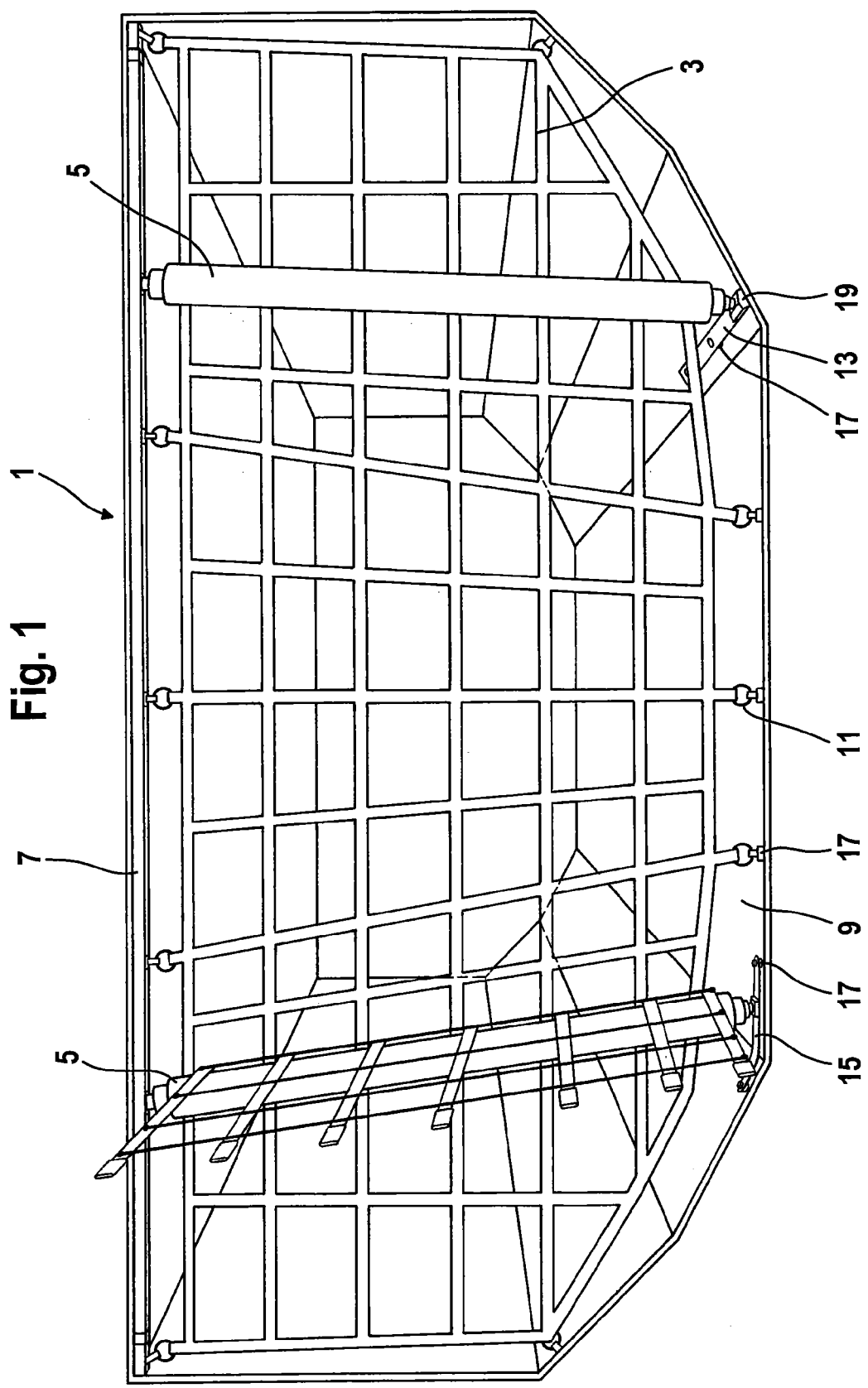
FIG. 1 is a schematic representation of an exemplary embodiment of an inventive netting arrangement in a cargo hold.

FIG. 1 shows a schematic representation of an exemplary embodiment of a netting arrangement 1 according to the invention inside a cargo hold 9, preferably inside an airplane.

A first baggage or cargo netting 3 is disposed inside a cargo hold 9 so as to extend across the width of the cargo hold 9. The netting is designed to include edge-side fixation points 11 that are introduced into fixation points 17 on the cargo hold side.

The netting arrangement 1 further provides at least one adapter 7, 13, 15 or 21 for securing the netting inside the cargo hold 9, which adapter is secured to at least two fixation points on the cargo hold side 17.

The adapter has the form of a transversal bar 7, for instance in a ceiling area of the cargo hold 9. This bar 7 furnishes a plurality of adapter-side fixation points 19 to which the fixation points 11 formed at the netting edge may be attached.

In the floor area of the cargo hold 9 there is moreover furnished a bridge-type adapter 15 extending in the width direction of the cargo hold 9. This adapter 15 in turn furnishes an adapter-side fixation point 19 into which a fixation point 11 formed on the netting side may be introduced.

According to the exemplary embodiment of the netting arrangement 1 of the invention, a second netting is secured in this bridge-type adapter 15 in order to keep cargo items away from the area of a cargo hold door and thus keep the cargo hold door accessible.

According to the exemplary netting arrangement 1, another adapter 13 extending in the longitudinal direction of the cargo hold 9 is furthermore disposed in the floor area of the cargo hold 9. This adapter 13 in turn furnishes an adapter-side fixation point 19 into which a fixation point 11 formed on the netting side may be introduced.

According to the exemplary embodiment of the netting arrangement 1 of the invention, a substantially vertical bar 5 is secured in this adapter 13.

On this bar 5, additional fixation points having a substantially vertical orientation may be formed (not shown), to which the netting 3 or also some other netting is secured, which case is exemplarily represented for a second bar 5 that is arranged both at adapter 15 and at adapter 7. The bar 5 is adapted, e.g., to receive forces in the x- and y-directions and up to a certain degree undergo a telescoping deformation when subjected to a force acting in the z-direction.

As may be seen in FIG. 1, the fixation points 11 for the netting 3 are arranged in a plane identical with the plane of the adapter-side fixation points 19 irrespective of the load applied to the netting 3. Furthermore in the condition where no load is applied on the netting 3, the netting 3 is situated in the same plane as the adapter-side fixation points 19.

Figure 2:
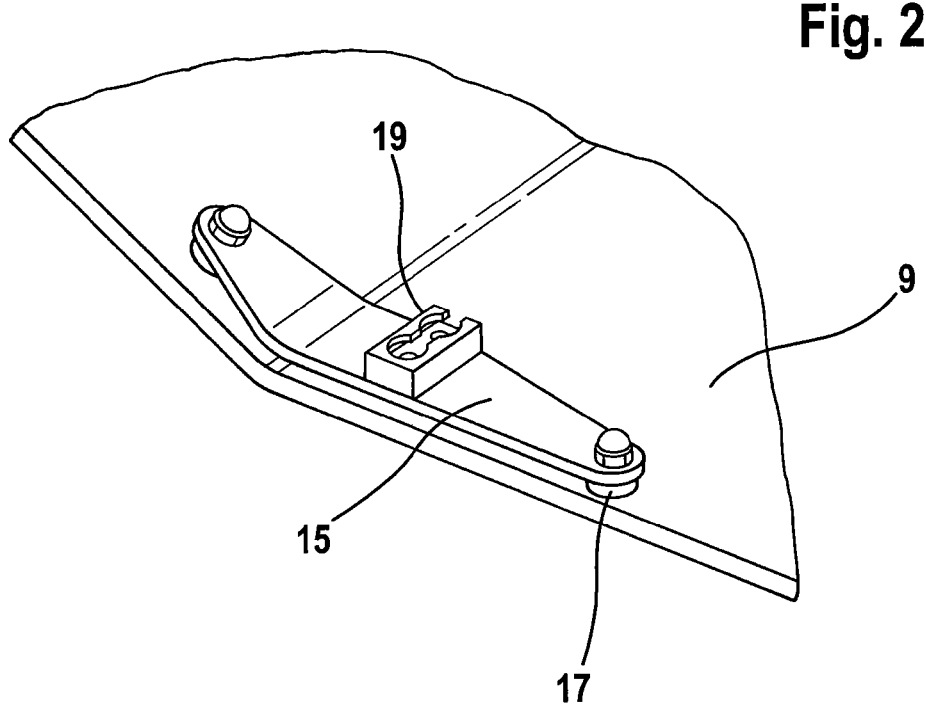
FIG. 2 is a representation of an inventive adapter in accordance with an exemplary embodiment of the present invention.

FIG. 2 furthermore shows a representation of an inventive adapter 15 in accordance with an exemplary embodiment of the present invention.

As may be seen in FIG. 2, the adapter 15 has a bridge-type configuration and connects two fixation points on the cargo hold side 17 that are formed in the width direction of the cargo hold 9.

Furthermore the adapter 15 furnishes an adapter-side fixation point 19 situated between the fixation points 17 on the cargo hold side into which the fixation points formed on the netting side may be introduced.

Due to the bridge-type configuration of the adapter 15 jointly with provision of the adapter-side fixation point 19, it is possible to furnish a fixation point that is required for securing the netting, i.e., adapter-side fixation point 19, in a location where originally no fixation point had been provided in the cargo hold.

At the same time, the maximum force that may be introduced into the airplane's supporting structure via the fixation points 17 on the cargo hold side may be increased significantly, for the force acting on the fixation point 19 formed on the adapter side may be introduced into two fixation points 17 formed on the cargo hold side.

By means of the adapter 15 represented in FIG. 2 and constituting an embodiment of the adapter of the present invention, it is furthermore possible to furnish a fixation point 19 for receiving fixation points formed on the netting side, even in locations in the cargo hold 9 where it is difficult if not impossible to provide a fixation point on the cargo hold side. This is true, e.g., in corner areas of the wall of the cargo hold 9 or in areas having a high curvature.

Figure 3:
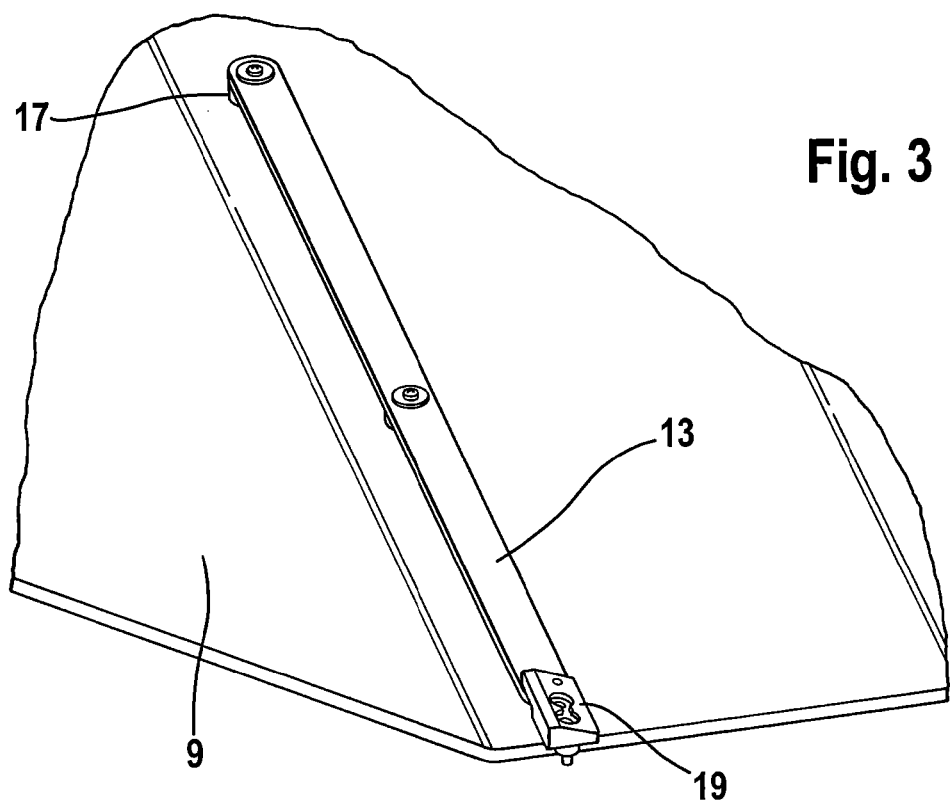
FIG. 3 is a representation of an inventive adapter in accordance with a different exemplary embodiment of the present invention.

FIG. 3 shows a representation of an inventive adapter 13 according to another exemplary embodiment of the present invention.

The adapter 13 represented in FIG. 3 generally extends in the longitudinal direction of the cargo hold 9 and is secured to at least two fixation points 17 formed on the cargo hold side so as to furnish an adapter-side fixation point 19.

In the case of the embodiment exemplarily represented in FIG. 3, the adapter 13 is secured to three fixation points on the cargo hold side 17 and furnishes an adapter-side fixation point 19 on an end side of the adapter 13.

Alternatively, the adapter 13 may also be arranged only on two or also on more than three fixation points 17 on the cargo hold side, so as to furnish one or several alternative or additional adapter-side fixation points 19 between the fixation points on the cargo hold side.

In the case of the adapter 13 represented in FIG. 3, the force introduced into the adapter 13 via the fixation point 19 formed on the adapter side is introduced into the three fixation points 17 formed on the cargo hold side to which the adapter 13 is secured. Hereby the force is decomposed into its components in the x-, y- and z-directions.

The force introduced by the netting or by the bar into the adapter-side fixation point 19 formed at the end side of the adapter 13, as represented in FIG. 3, is initially decomposed into its y- and z-components in the location of the adapter-side fixation point 19, and these components are diverted into the fixation point 17 on the cargo hold side that is disposed below the adapter-side fixation point 19.

If the force acting on adapter 13 increases, it is moreover split up further into its x- and y-components that are then diverted into the additional fixation points on the cargo hold side 17 situated behind the adapter-side fixation point 19.

In the exemplary embodiment represented in FIG. 3, in which the adapter-side fixation point 19 is provided on an end side, the adapter 13 may have the form either of a pliant, belt-type member having tensile strength, or of a rigid, bar-type member having tensile strength.

If, in contrast, the adapter-side fixation point 19 is provided between the two end sides of the adapter 13, the adapter 13 will only have the form of a rigid, bar-type member having tensile strength.

Figure 4:
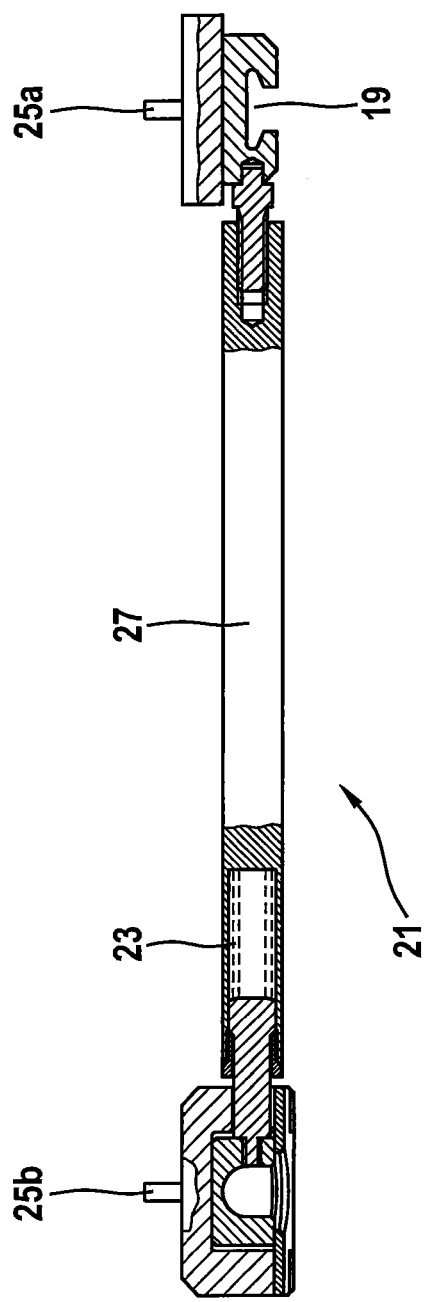
FIG. 4 is a representation of an inventive adapter in accordance with another exemplary embodiment of the present invention.

FIG. 4 shows a representation of an inventive adapter 21 in accordance with another exemplary embodiment of the present invention.

Here the adapter 21 has the form of a compression bar extending in the longitudinal direction of the cargo hold and includes a spring element 23 accommodated inside a casing 27 that is pre-tensioned to a particular tension.

By means of the adapter 21, the forces acting on the fixation point 19 that is formed on an end side of the adapter 21 are purposely introduced into the supporting structure of the airplane.

Preferably the adapter 21 is then designed such that the adapter 21 extends from a fixation point 25*a*—in the exemplary embodiment disposed opposite the fixation point 19 for securing the netting at the adapter 21 and secured to a first fixation point on the cargo hold side—to a second fixation point 25*b* that extends forward from the netting in the longitudinal direction, i.e., away from the cargo.

As a result, it is possible to increase the forces acting on the netting and thus on the adapter 21, which may then be diverted into the fixation points on the cargo hold side.

Alternatively, the adapter 21 may also extend from the first fixation point 25*a*—in the exemplary embodiment disposed opposite the fixation point 19 for securing the netting to the adapter 21 and secured to a first fixation point on the cargo hold side—to a second fixation point 25*b* extending aft from the netting in the longitudinal direction, i.e., towards the cargo.

Apart from the fixation points 19 for receiving the netting that may be formed on the respective end sides on the adapter 21, there is moreover an alternative possibility of providing such fixation points 19 for securing the netting, as an alternative or in addition, between the fixation points 25*a* and 25*b* along the casing 27 of the adapter 21.

Furthermore the adapter 21 represented in FIG. 4 may alternatively also be arranged in the width direction in the cargo hold to thus receive, e.g., a fixation point formed on the netting side for a netting that longitudinally extends in the cargo hold and serves, e.g., to keep the cargo hold door free.

Figure 5:
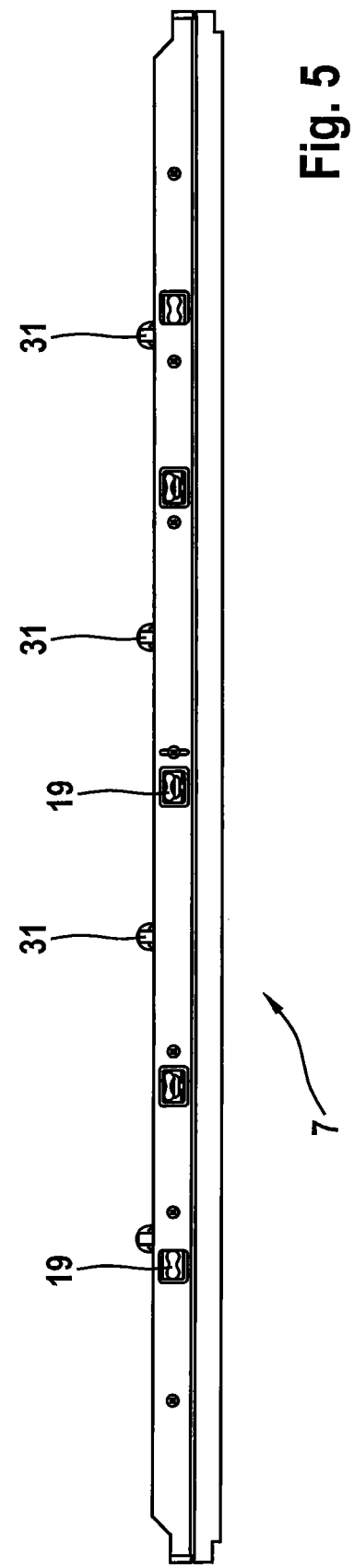
FIG. 5 is a representation of an inventive adapter in accordance with another exemplary embodiment of the present invention.

FIG. 5 shows a representation of an inventive adapter 7 according to another exemplary embodiment of the present invention.

This adapter 7 has the form of a transverse bar extending in the width direction of the cargo hold and includes a plurality of fixation points 19 formed on the adapter side and extending along the adapter 7, in which a plurality of belt members of the netting for securing the latter to the adapter 7 may in turn be received.

The adapter 7 itself is attached at a plurality of fixation points on the cargo hold side and secured in at least one direction in at least one fixation point on the cargo hold side. Alternatively, the adapter 7 may also be linked not to the fixation points on the cargo hold side but to additional fixation members extending in the longitudinal direction in the cargo hold, e.g., the longitudinal adapter 13, wherein the longitudinal adapter 13 may alternatively also be disposed at the cargo hold ceiling. Such additional fixation members may in turn be disposed at two or more fixation points on the cargo hold side, so that the force acting on the adapter 7 may be distributed to several fixation points on the cargo hold side, whether on the floor or on the ceiling.

In the embodiment represented in FIG. 5, the adapter 5 is secured to the cargo hold ceiling on both end sides (also see FIG. 1) and furthermore includes a plurality of further connecting links 31 that are in turn in connection with fixation points formed on the cargo hold side.

According to the schematic representation in FIG. 5, each connecting link 31 formed at the adapter 7 has a substantially tongue-type configuration and includes an opening, which openings enter into contact with further fixation points on the cargo hold side starting from a particular degree of deformation of the adapter 7 due to the load acting on the latter through the netting.

As is moreover exemplarily represented in FIG. 1, it is possible to use one or several adapters in various combinations so as to create a netting arrangement whereby a low-cost standard netting instead of a special cargo netting may continuously be secured in the cargo hold. In this case the single adapters may have an arrangement as exemplarily described in the foregoing, and thus furnish a sufficient number of fixation points for receiving fixation points formed on the netting side.

FIGS. 6A through 6D show detail views of an exemplary embodiment of a netting arrangement.

Here the netting 3 is attached to fixation points on the cargo hold side (not shown) through the intermediary of the fixation points 11 formed at the edge of the netting. In addition, the netting 3 is moreover secured to the substantially vertical bar 5.

In accordance with the schematic representation in FIG. 6A, the configuration of the bar 5 at its upper end 5' is such that it may telescopingly extend in the longitudinal direction of the bar when acted on by a determined force.

As is furthermore represented in FIG. 6B, in addition to being secured to the fixation points on the cargo hold side (not shown) and/or the adapters (also not shown), the netting may continuously be arranged in fixation points 33 formed on the bar 5, whereby stability of the netting arrangement may be enhanced.

FIG. 6C shows a top view of point A-A in FIG. 6A.

In accordance with the exemplary representation in FIG. 6C, the bar 5 has on at least one side fixation points 33 for receiving, e.g., fixation points 11' arranged on the netting side. The netting 3 is in accordance with the representation in FIG. 6C taken, e.g., in an arc along the bar 5 or tangentially applied thereto, and optionally in addition held at the bar 5 by means of the bar-side fixation points 5 in connection with the fixation points 11' disposed on the net side.

The bar-side fixation points 33 may have the form of snap locks, hooks, shackles, etc., for receiving the netting-side fixation points 11'.

FIG. 6D finally shows a perspective representation of the netting arrangement 1 of the invention. The netting 3 is linked to fixation points (not shown) in the cargo hold by means of netting-side fixation points 11 and is moreover—as described in the foregoing—taken in an arc along the bar 5 or tangentially or radially applied thereto. As was described in the foregoing, the netting 3 is disposed on the bar 5.

FIGS. 7A through 7C show detail views of another exemplary embodiment of the netting arrangement of the invention.

In accordance with the representation in FIG. 7A, a netting is arranged at the bar 5 at an angle. According to this exemplary embodiment it is possible to dispose a single piece of netting with the aid of the bar 5 so as to extend in any desired angle.

Alternatively it is also possible to arrange a first netting 3', for instance in the longitudinal direction of the cargo hold, to thus, e.g., keep the area around a cargo hold door free with the aid of the netting 3'. In addition it is possible to arrange a second netting 3" in the transverse direction of the cargo hold, whereby it is then possible to restrict cargo hurled through the cargo hold in an uncontrolled manner, e.g., in the event of an emergency such as an emergency landing, an unexpected, sudden change of direction of the airplane, violent turbulences, or the like.

The nettings 3' and 3" may in accordance with the representation in FIG. 7A be attached to the bar 5 while forming a right angle with each other. By means of netting-side fixation points 11 the netting is, or the nettings 3' and 3" are, in accordance with the above description moreover secured to fixation points on the cargo hold side and on fixation points in the cargo hold furnished by the adapter.

FIG. 7B shows the view of the alternative embodiment of the inventive netting arrangement of FIG. 7A in a view rotated counter-clockwise through 90°.

As is shown in FIG. 7B, the netting 3" which in this exemplary embodiment extends in the transverse direction of the cargo hold, has an obliquely tapering configuration in a lower area. Thanks to this configuration of the netting that follows the contour of the cargo hold, it is possible to realize a distance of the netting's bottom and top edges from the cargo hold floor, ceiling and side walls of maximum uniformity over the entire width of the cargo hold, whereby single cargo pieces may be prevented from "slipping through" under the netting 3' and 3" or past it.

As is further represented in FIG. 7B, the nettings 3' and 3" are secured, by means of netting-side fixation points 11', to fixation points 33 formed on the bar 5 having a substantially vertical orientation. Furthermore the netting is secured to fixation points on the cargo hold side (not shown) by means of netting-side fixation points 11.

FIG. 7C moreover shows a perspective representation of the further embodiment of the inventive netting arrangement 1 as described in FIGS. 7A and 7B. Here the first netting 3' and the second netting 3" are each linked to fixation points (not shown) in the cargo hold by means of netting-side fixation points 11. Furthermore the two nettings 3' and 3" are secured to the vertical bar 5 so as to form a right angle with each other.

Figure 8:
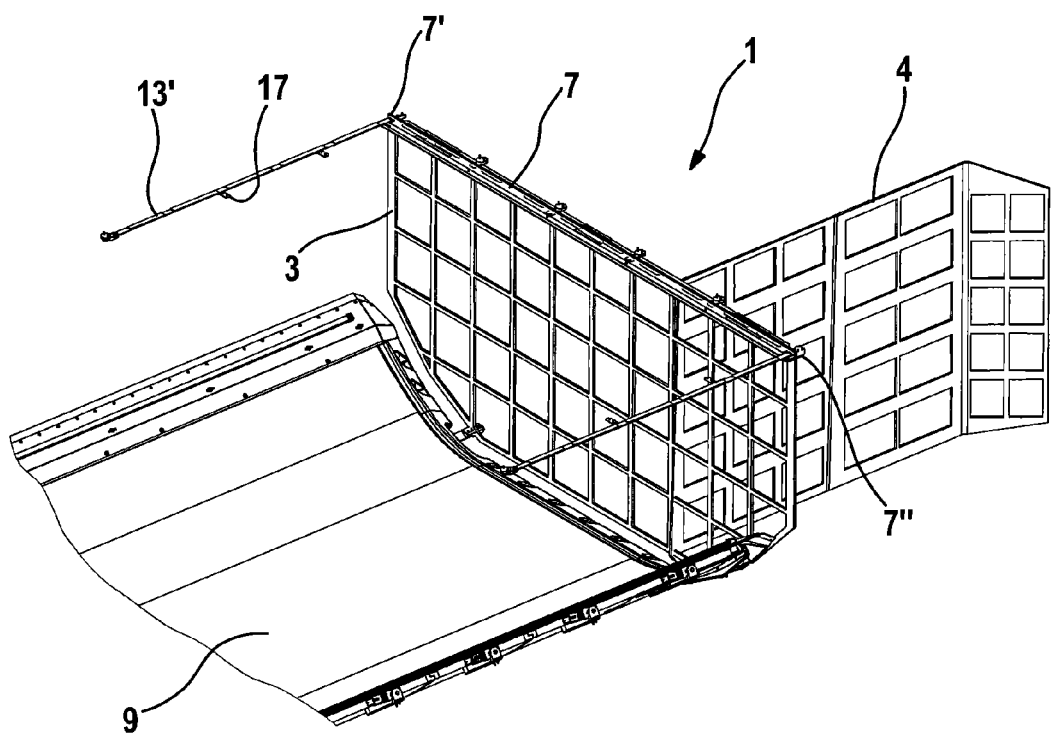
FIG. 8 shows a schematic representation of another exemplary netting arrangement in the cargo hold of an airplane.

FIG. 8 finally shows a schematic representation of another exemplary netting arrangement 1 in an airplane's cargo hold 9.

In this case a first netting 3 is arranged over the cargo hold width and secured to fixation points 17 on the cargo hold side as well as secured to a transversal adapter 7 formed on the cargo hold ceiling.

The transversal adapter 7 on the cargo hold ceiling is arranged at its outer sides 7' and 7" on a fixation member 13' extending in the longitudinal direction of the cargo hold that is, e.g., linked to fixation points on the cargo hold side 17 provided in the ceiling. This fixation member may, e.g., be the above described adapter 13, or alternatively another longitudinal fixation member 13', under the condition that the latter is suitable for receiving the forces transferred by the adapter 7 from the netting 3 and diverting them into the supporting structure of the cargo hold 9.

As is moreover represented in FIG. 8, a second netting 4 is disposed at a right angle with the netting 3 in the longitudinal direction of the cargo hold so as to keep the area of a cargo hold hatch (not shown) free from cargo.

The netting construction 1, in FIG. 8 comprised of the two nettings 3 and 4, may alternatively also consist of more than two nettings.

Thus it is conceivable for a first netting to extend in the transverse direction of the cargo hold as far as the area of intersection of the nettings 3 and 4, as represented in FIG. 8. In this area of intersection there may be, for instance, a bar (not shown) in accordance with the foregoing discussion, to which the first netting is secured. On this bar, a second netting may moreover be arranged which extends in the longitudinal direction of the cargo hold along the width of the cargo hold hatch as far as another bar (not shown). On each bar a further netting may then additionally be arranged which has, for instance, in accordance with the representation in FIG. 7B an obliquely extending netting lower edge, in order to achieve adaptation to the cargo hold contour.

By means of these four nettings in this example it is possible to achieve securing of the cargo both in the longitudinal direction of the cargo hold and in the area of the cargo hold hatch, as is also the case in the above discussed netting arrangement comprising one or two nettings.

Moreover in the case of using more than two nettings it is possible to use standardized nettings of simple configuration over large areas of the cargo hold, particularly in the transversal or longitudinal directions of the cargo hold. Only in the marginal areas of the cargo hold it is necessary to utilize nettings adapted to the respective fuselage structure of the airplane.

This allows to reduce the costs for the nettings, and the netting arrangement may be simplified.

By means of the netting construction of the invention employing the inventive adapter, it is moreover possible to achieve a continuous attachment of a standard cargo netting in the cargo hold, in particular inside an airplane, without requiring a costly netting specially manufactured for this purpose, and wherein the maximum shearing loads of up to 5.9 kN and maximum tensile loads of up to 6.8 kN, or maximum loads of up to 8.9 kN in any direction—as defined by Airbus, for example—that may securely be received in the respective points as predetermined by the netting fixation points provided on the cargo hold side and the tie-down points, may be increased with the aid of the adapters as these uniformly distribute the load acting on them over a plurality of fixation points on the cargo hold side.

By means of the netting arrangement achievable in this manner a homogeneous distribution and introduction of forces into the fixation points on the cargo hold side is moreover possible.

Moreover the netting arrangement that may be realized with the adapters may be transposed to any desired airplane constructions as long as these are provided with corresponding fixation points in the cargo hold to which the adapters may be secured, without having to provide expensive or sophisticated constructions for the respective cargo hold type.

The present invention thus relates to a netting arrangement 1 for a cargo hold 9, particularly in an airplane, comprising: at least one netting 3 including a plurality of fixation points 11 preferably formed on an edge side, a plurality of fixation points 17 formed on the cargo hold side, and at least one adapter 7, 13, 15, 21 for securing the netting 3 in the cargo hold 9.

The adapter 7, 13, 15, 21 is secured to at least two fixation points 17 on the cargo hold side for diverting a load applied to the adapter 7, 13, 15, 21 into the at least two fixation points 17 on the cargo hold side. The adapter 7, 13, 15, 21 is situated in the path of force between the netting fixation points 11 preferably formed on an edge side and the fixation points 17 on the cargo hold side.

The adapter 7, 13, 15, 21 moreover furnishes at least one adapter-side fixation point 19 for securing the netting 3 to the adapter 7, 13, 15, 21. The fixation points for the netting are arranged in a plane identical with the plane of the adapter-side fixation points 19, independently of the load applied on the netting. In a condition where no load is applied to the netting 3, the netting is situated in the same plane as the adapter-side fixation points 19.

The invention moreover relates to an adapter 7, 13, 15, 21, preferably for use with a like netting arrangement.

The invention claimed is:

1. A netting arrangement for a cargo hold in an airplane having one or more first cargo hold fixation points and one or more second cargo hold fixation points, the netting arrangement comprising:
at least one netting including a plurality of circumferential netting fixation points formed on an edge side of the netting, and
one or more adapters for securing the netting in the cargo hold, each adapter is adapted to be secured to at least a first cargo hold fixation point of the cargo hold and a second cargo hold fixation point of the cargo hold so as to divert a load applied to the adapter into the first and second cargo hold fixation points of the cargo hold to which the adapter is attached, the adapter arranged in the path of force between the netting fixation points formed on the edge side of the netting and the cargo hold fixation points of the cargo hold, each adapter comprising at least one adapter-side fixation point for attachment to a netting fixation point to secure the netting to the adapter, the netting fixation points being arranged in a plane identical with the plane of the adapter-side fixation points, independently of the load applied on the netting, and when in the condition where no load is applied on the netting, the netting is situated in the same plane as the adapter-side fixation points,
wherein the netting is adapted to be circumferentially fixed in the cargo hold by the combination of the first and second cargo hold fixation points of the cargo hold and the adapter-side fixation points of the adapters.

2. The netting arrangement according to claim 1,
wherein at least one adapter has the form of a bar extending transversely in the width direction of the cargo hold so as to receive a number of belt members of the netting,
wherein the bar is arranged along one or more further cargo hold fixation points of the cargo hold and is secured in at least one direction in at least one cargo hold fixation point of the cargo hold,
wherein the bar further comprises one or more connecting links connecting the transversely extending bar with the further cargo hold fixation points of the cargo hold, and
wherein the bar is adapted to distribute forces applied to the bar onto the cargo hold fixation points of the cargo hold.

3. The netting arrangement according to claim 2, wherein the bar is adapted to introduce a first force applied to the bar into the at least one of the cargo hold fixation points of the cargo hold in which the bar is secured, and in that the bar is further adapted to distribute a second force applied to it onto further cargo hold fixation points of the cargo hold through a controlled deformation of the bar.

4. The netting arrangement according to claim 2, wherein starting from a particular degree of deformation of the bar, the connecting links enter into contact with the further cargo hold fixation points of the cargo hold.

5. The netting arrangement according to claim 2, wherein each connecting link has a substantially tongue-type configuration and includes an opening.

6. The netting arrangement according to claim 5, wherein the opening extends in the longitudinal direction of the cargo hold or in the width direction of the cargo hold and enters into contact with the cargo hold fixation point of the cargo hold depending on the degree of deformation of the bar.

7. The netting arrangement according to claim 1, wherein at least one adapter has a bridge-type configuration, and the at least one adapter-side fixation point of the adapter is located between the first and second cargo hold fixation points of the cargo hold to which the adapter is connected.

8. The netting arrangement according to claim 7, wherein the adapter extends in the width direction of the cargo hold.

9. The netting arrangement according to claim 1,
wherein at least one adapter has the form of a longitudinal fixation member extending in the longitudinal direction of the cargo hold,
the fixation member being secured to the first and second cargo hold fixation points of the cargo hold and extending along a longitudinal line of the cargo hold,
the fixation member including the at least one adapter-side fixation point, and
the fixation member adapted to distribute loads applied to it in the longitudinal direction onto the cargo hold fixation points of the cargo hold to which the fixation member is secured.

10. The netting arrangement according to claim 9, wherein the longitudinal fixation member includes at least one adapter-side fixation point between the first and second cargo hold fixation points of the cargo hold to which the fixation member is secured, and/or furnishes an adapter-side fixation point at one end of the longitudinal fixation member.

11. The netting arrangement according to claim 1,
wherein at least one adapter has the form of a longitudinal compression bar including at least one pre-tensioned spring element for a controlled distribution of forces, the compression bar extending in the longitudinal direction of the cargo hold,
the compression bar being secured to the first and second cargo hold fixation points and extending along a longitudinal line in the cargo hold,
the compression bar including the at least one adapter-side fixation point,
wherein the compression bar distributes forces applied to it in the longitudinal direction through the intermediary of the pre-tensioned spring element, and
wherein the compression bar distributes the forces applied to it into the cargo hold fixation points of the cargo hold to which the compression bar is secured in case a force applied to the compression bar exceeds a pre-tension threshold of the spring element.

12. The netting arrangement according to claim 11, wherein the compression bar includes at least one adapter-side fixation point between the first and second cargo hold fixation points of the cargo hold to which the compression bar is secured, and/or furnishes an adapter-side fixation point at one end of the compression bar.

13. A netting arrangement for attachment to one or more first cargo hold fixation points and one or more second cargo hold fixation points of a cargo hold of an aircraft, the netting arrangement comprising:
- a netting including a plurality of netting fixation points located at an edge of the netting;
- one or more adapters for attaching the netting to the first and second cargo hold attachment points of the cargo hold, each adapter adapted to be attached to a first cargo hold attachment point and to a second cargo hold attachment point of the cargo hold, each adapter including an adapter-side fixation point adapted to be connected to a netting fixation point of the netting; whereby each netting fixation point is adapted to be attached to a first cargo hold fixation point and a second cargo hold fixation point of the cargo hold by an adapter.

14. The netting arrangement of claim 13 wherein at least one adapter comprises a bar.

15. The netting arrangement of claim 13 wherein the adapter-side fixation point of at least one adapter is located between the first and second cargo hold fixation points of the cargo hold to which the at least one adapter is connected.

* * * * *